United States Patent [19]

Suda

[11] Patent Number: 5,802,408
[45] Date of Patent: Sep. 1, 1998

[54] CAMERA

[75] Inventor: Yasuo Suda, Kanagawa-ken, Japan

[73] Assignee: Canon Kabushiki Kaisha, Tokyo, Japan

[21] Appl. No.: 505,101

[22] Filed: Jul. 21, 1995

[30] Foreign Application Priority Data

Jul. 29, 1994 [JP] Japan .................. 6-178521

[51] Int. Cl.$^6$ .................. G03B 13/02
[52] U.S. Cl. .................. 396/296
[58] Field of Search .................. 354/471–475, 354/289.1–289.12; 396/281, 287–292, 295, 296

[56] References Cited

U.S. PATENT DOCUMENTS 4,949,118 8/1990 Yamamoto et al. .................. 354/475
5,235,380 8/1993 Yamada et al. .................. 354/471

Primary Examiner—David M. Gray
Attorney, Agent, or Firm—Robin, Blecker, Daley and Driscoll

[57] ABSTRACT

A camera has a movable mirror arranged to permit its position to be switched between a first position in which an image light flux is guided to a viewfinder optical system and a second position in which an exposure can be carried out by an image pickup part, a display device arranged to make a display by superimposing a light from a light source on an image obtained within a viewfinder, and a control circuit arranged to cause the light source to begin to light up either while the movable mirror is in process of moving from the second position to the first position or within a period of time during which the movable mirror stabilizes in the first position.

19 Claims, 13 Drawing Sheets

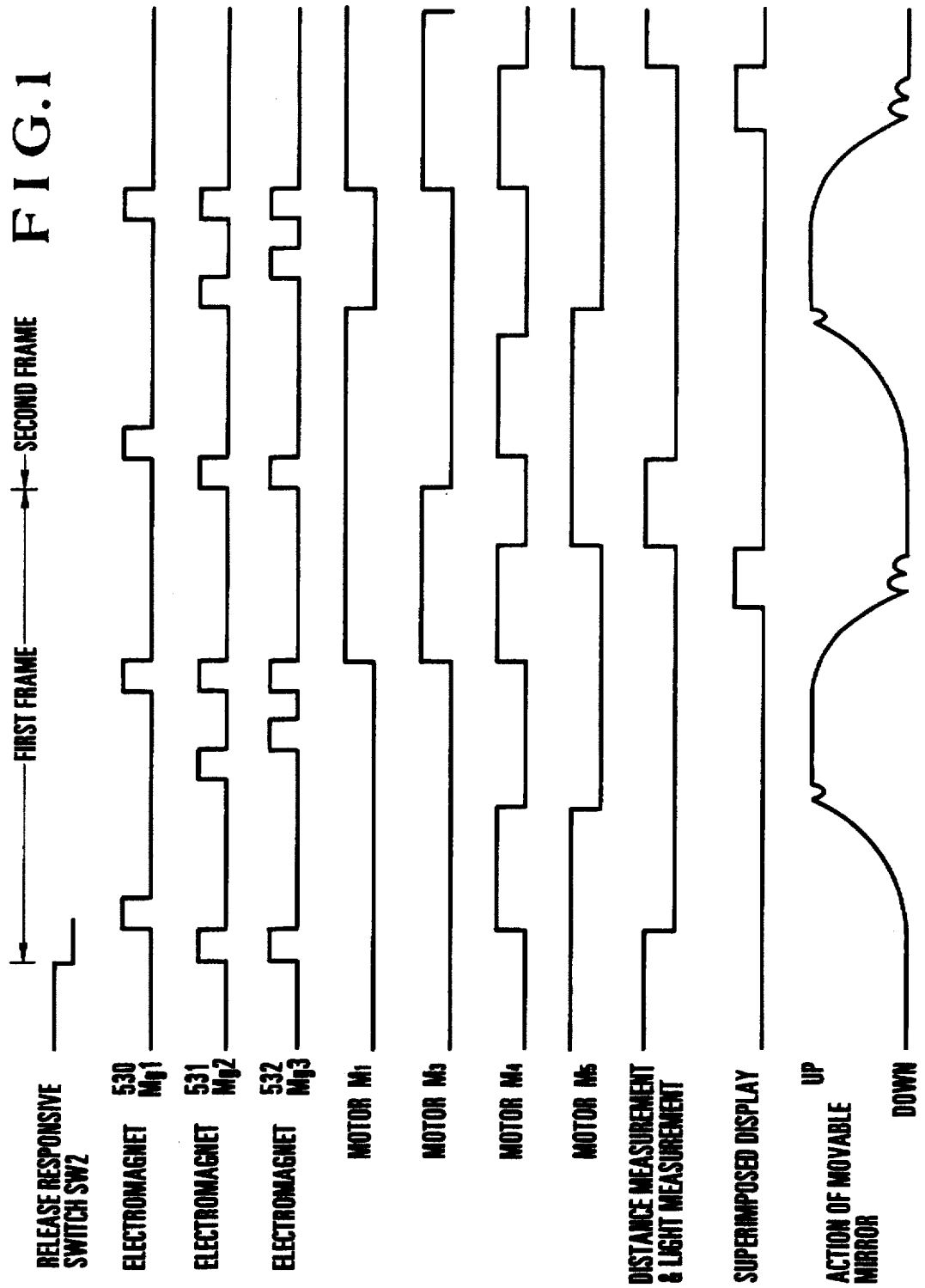

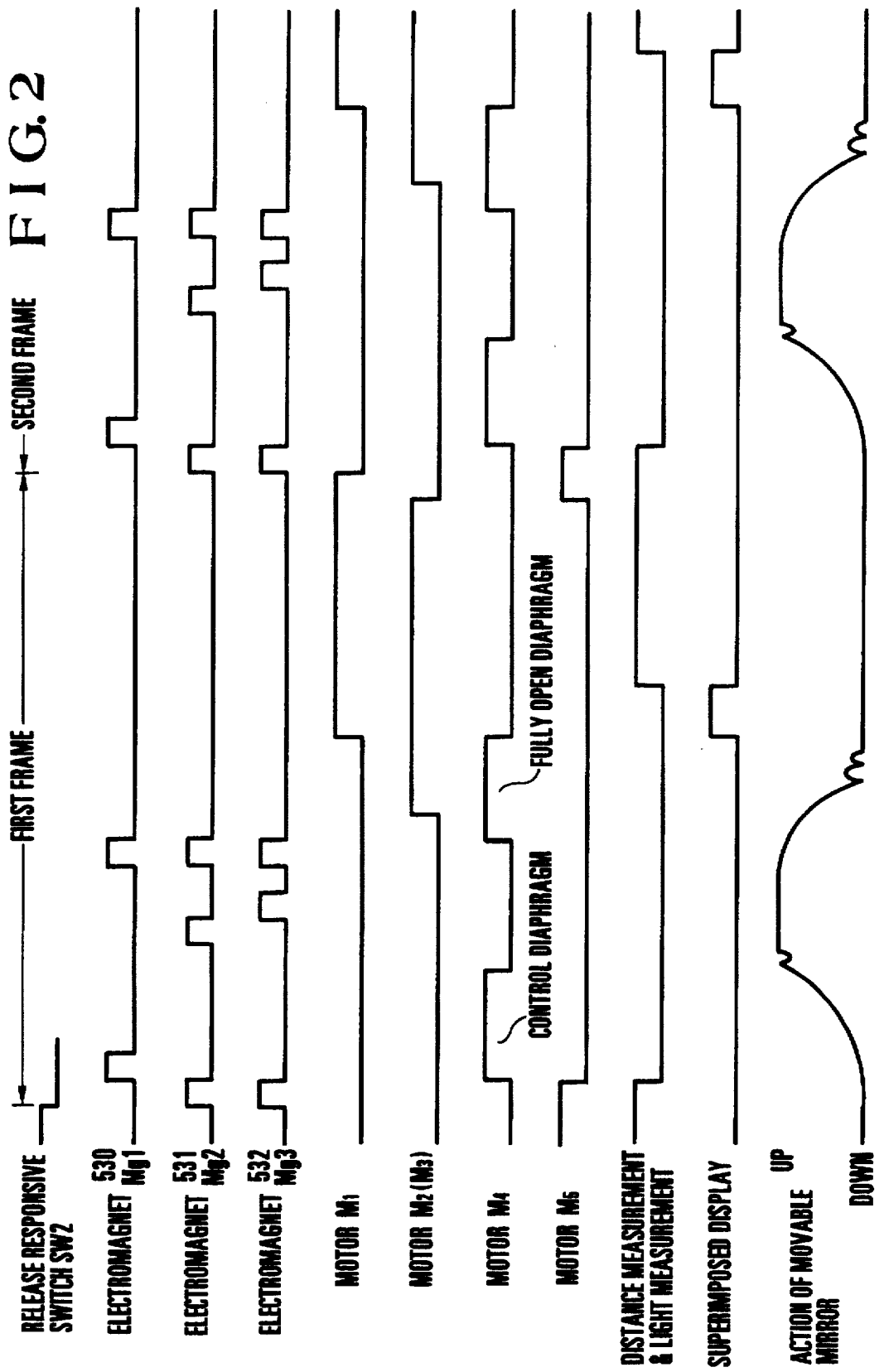

FIG.12(a)
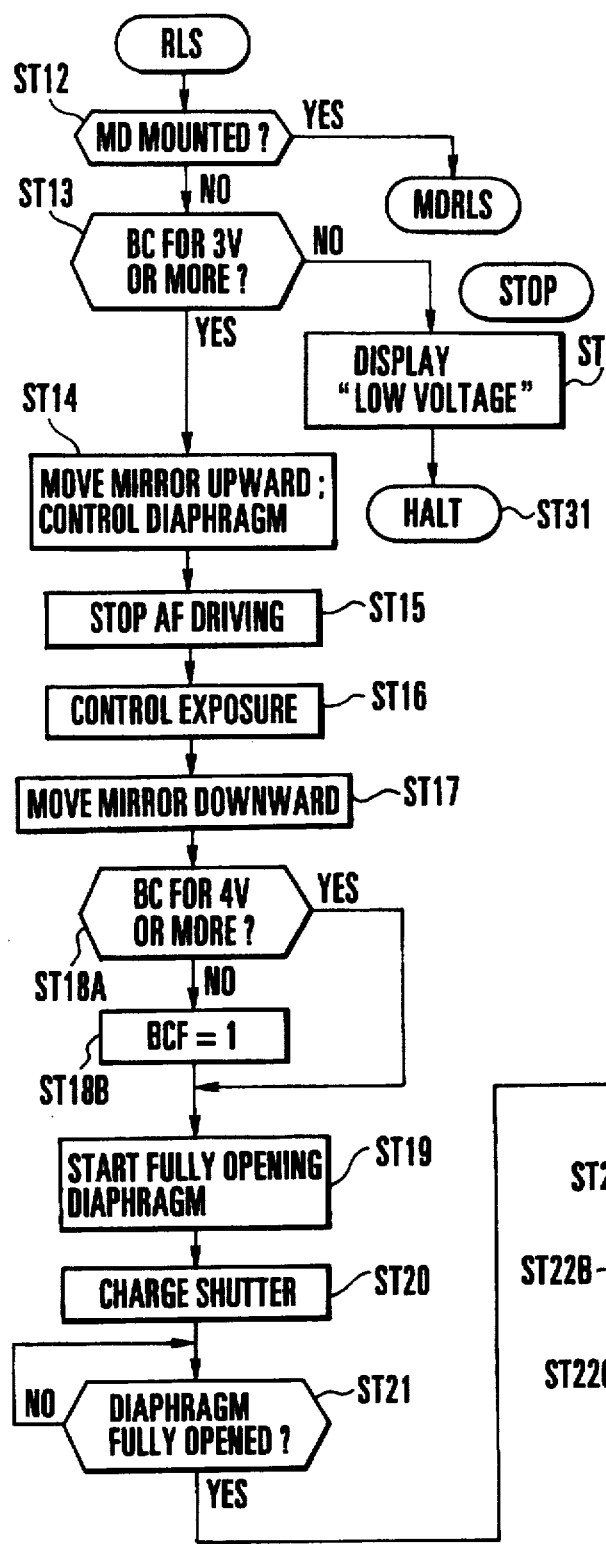
FIG.12(b)
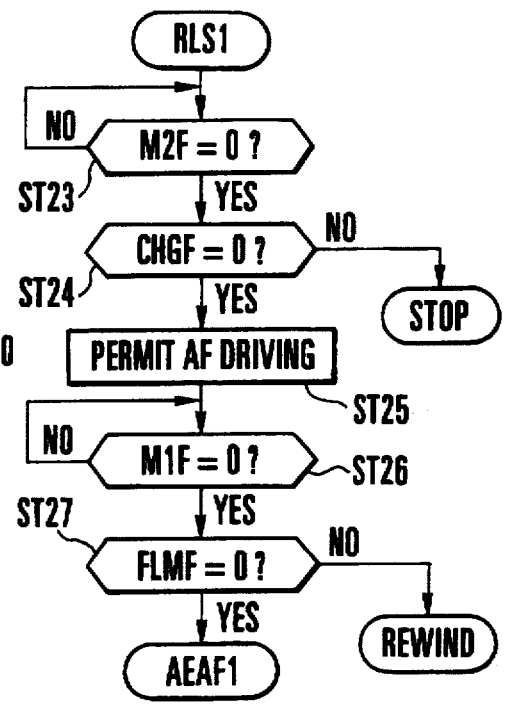
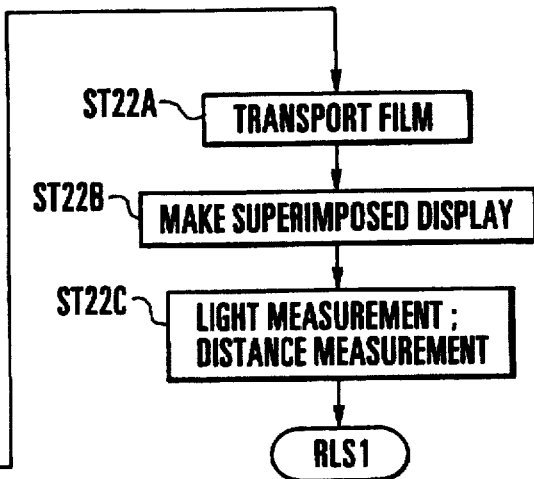

FIG.13
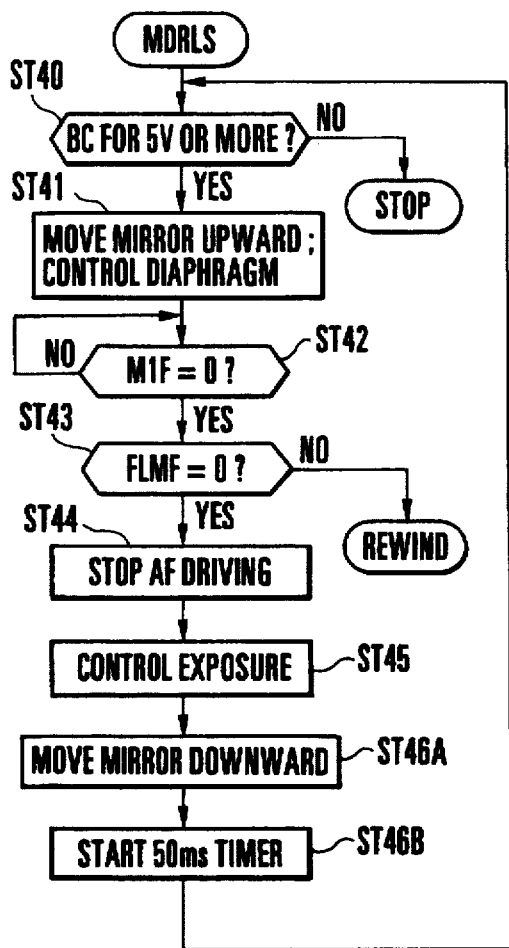
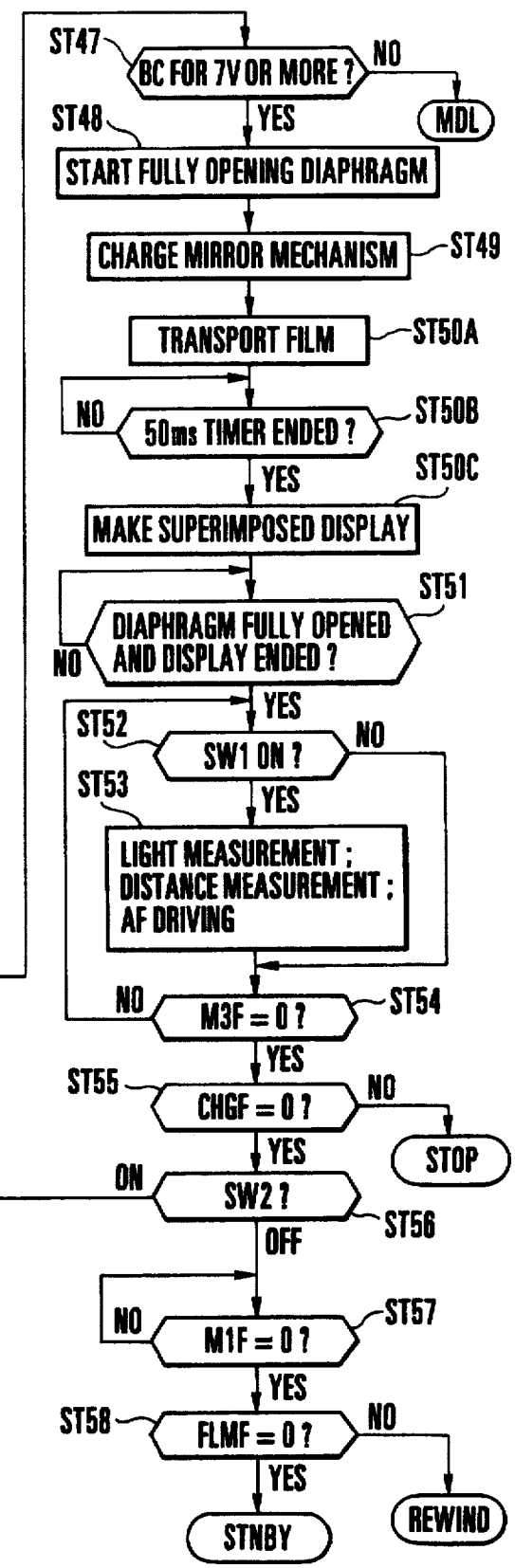

CAMERA

BACKGROUND OF THE INVENTION

1. Field of the Invention

This invention relates to a camera having a display device which is arranged to display information in a state of being superimposed on an image obtained within a viewfinder.

2. Description of the Related Art

The art of making a display called a superimposed display on a camera or the like which has a plurality of distance measuring fields (focus detecting areas) has been known. The superimposed display is made with a frame which indicates a selected distance measuring field displayed in a state of being superimposed on an image of an object of shooting obtained within a viewfinder field.

With the display superimposed on an image, the position and the state of the display highly intuitionally purport "an automatic focusing distance measuring field" and "a focusing state", respectively.

Generally, the superimposed display can be divided into two types. One is a light-blocking type display which enables the photographer to view a display part by blocking the light of the object image at the display part. The other is a light-emitting type which enables the photographer to view the display part by brightening the display part. In one example of the former, a guest-host type liquid crystal display device is disposed in the neighborhood of a focusing screen within the optical system of the viewfinder and light is blocked by a liquid crystal display, as disclosed in Japanese Laid-Open Patent Application No. HEI 4-345150. One example of the latter is arranged to use an LED as a light source for projecting a pattern image on a focusing screen, as disclosed in "SYASHIN KOGYO" (Photographic Industry), Vol. 51, No. 9, September 1993 issue, p 58 to 66.

Meanwhile, a device disclosed in Japanese Laid-Open Patent Application No. HEI 6-82678 shows another example. In this case, an illumination light is applied to a display part which normally appears black, with the light of the object image blocked, to brighten it in the color of a light source, thus making a sort of the light-emitting type superimposed display.

The light-emitting type superimposed display has the following advantages over the light-blocking type:

○ Since the lighted-up display attracts the attention of the photographer, the possibility of oversight is rare.

○ A higher degree of latitude is allowed in selecting the color of display.

○ A good observability is obtained even where the luminance of the object of shooting is low.

These features give many advantages to the light-emitting type superimposed display, as compared with the light-blocking type superimposed display.

The general practice of having a built-in automatic film winding mechanism has become popular also in the field of single-lens reflex cameras. Hence, it has become a strong desire to make superimposed displays as often as possible during a sequence of actions to be carried out in the mode of continuous shooting. It is highly advantageous to show, in the light-emitting type superimposed display, a currently selected distance measuring field while continuous shooting is in process. This is because the use of any display other than the light-emitting type superimposed display which is highly discernible is hardly practicable, as images repeatedly appear and disappear in and from the viewfinder of a single-lens reflex camera during continuous shooting.

In respect to the specifications of cameras, the above-stated desire can be regarded as deployment of what has been practiced for rangefinder type cameras into the field of the single-lens reflex cameras. For a single-lens reflex camera, however, it is not easy to cause a light-emitting type superimposed display device to operate while the camera is in the process of continuous shooting. It is most important, in this case, to take heed to an adverse effect of the illumination light of the superimposed display device on a light measuring circuit and a distance measuring circuit.

When a display is made by the device while the camera is in a light or distance measuring process, the illumination light of the display might become a stray light which tends to fall on the light measuring circuit or the distance measuring circuit which is arranged to receive light. The stray light tends to lower the accuracy of an exposure or that of distance measurement. In view of this, according to an article appearing in the above-cited "SYASHIN KOGYO", Vol. 51, No. 9, September 1993 issue, p 58 to 66, a light measuring action and a light-emitting type superimposed display must be carried out in a time-dividing manner.

If such a method is applied to a continuous shooting operation, these actions are carried out in the following manner: an exposure action → a superimposed display → light/distance measurement → an exposure action → a superimposed display → light/distance measurement → It is apparent that this method inevitably results in a slower speed of continuous shooting. For a single-lens reflex camera which features a speedy continuous shooting operation, the addition of any function that incurs a decrease in speed of the continuous shooting operation is hardly practical. However, there has been contrived no arrangement that permits a superimposed display without impairing the speediness of continuous shooting.

The term "an exposure action" as used herein means a sequence of processes beginning with a process of retracting a movable mirror and ending with returning the movable mirror after completion of a shutter action.

SUMMARY OF THE INVENTION

It is one aspect of the present invention to provide a camera having a movable mirror arranged to be switched between a first position in which an image light flux is guided to a viewfinder optical system and a second position in which the image light flux is guided to image pickup means, a display device arranged to make a display by superimposing a light from a light source on an image obtained within a viewfinder, and control means arranged to cause the light source to begin to light up either while the movable mirror is in process of moving from the second position to the first position or within a period of time during which the movable mirror stabilizes in the first position.

The above and other aspects and features of the invention will become apparent from the following detailed description of a preferred embodiment thereof taken in connection with the accompanying drawings.

BRIEF DESCRIPTION OF THE DRAWINGS

FIG. 1 is a timing chart showing an operation to be performed with a motor drive device mounted on a camera arranged as an embodiment of the invention.

FIG. 2 is a timing chart showing an operation to be performed by the camera of the invention without mounting the motor drive device.

FIGS. 12(a) and 12(b) are flow charts showing operations of the driving circuit of the same camera.

FIG. 13 is a flow chart showing an operation of the same driving circuit of the camera shown in FIG. 10.

DETAILED DESCRIPTION OF THE PREFERRED EMBODIMENT

An embodiment of the invention is described with reference to the drawings as follows: The embodiment is a photo-taking apparatus consisting of a motor drive device MD and a single-lens reflex camera B which includes two motors and a first battery.

Figure 3A:
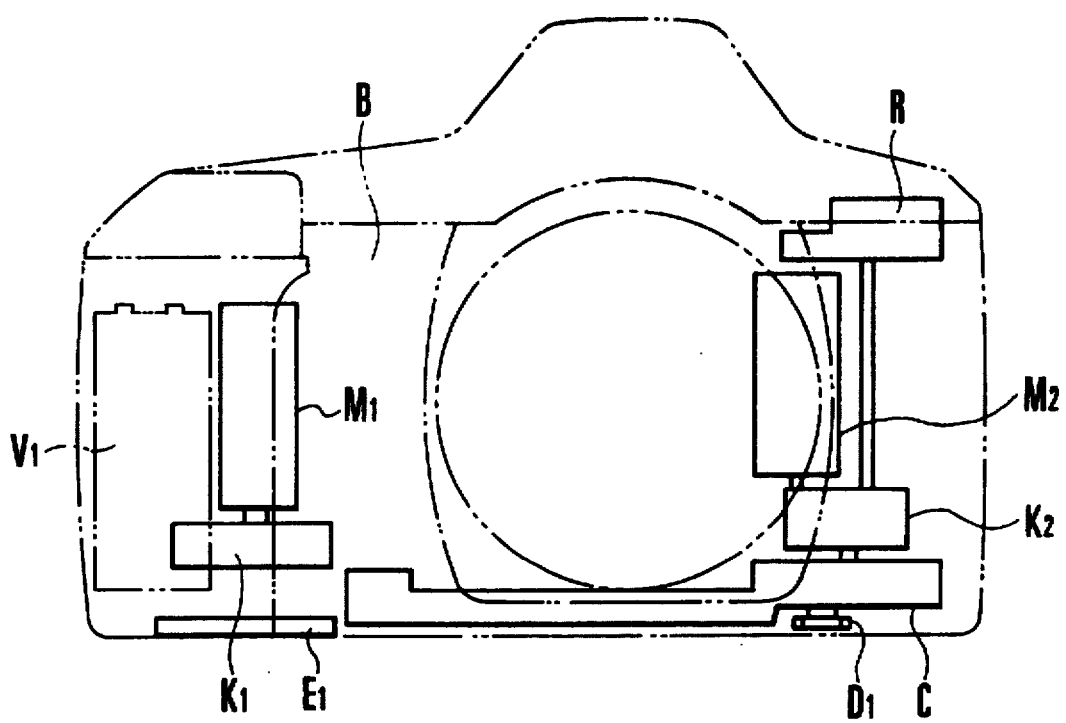
FIGS. 3(a) and 3(b) show the camera which is arranged as an embodiment of the invention, FIG. 3(a) showing it alone in a front view and FIG. 3(b) showing it with a motor drive device in a longitudinal sectional view.
Figure 3B:
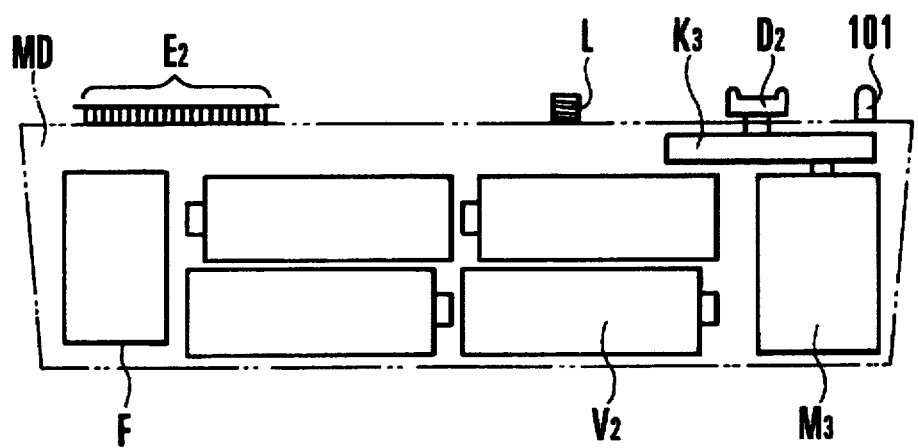

Referring to FIGS. 3(a) and 3(b), a first battery V1 is disposed within the camera B. A first motor M1 is arranged to drive a film winding (power) transmission mechanism K1 which is disposed within the camera B. A second motor M2 is arranged to drive a film rewinding (power) transmission mechanism R and a shutter charging transmission mechanism C which are disposed within the camera B. A power transmission mechanism K2 includes a switching mechanism which is arranged to transmit a power generated by the motor M2 to both the film rewinding transmission mechanism R and the shutter charging transmission mechanism C when the motor drive device MD is not mounted on the camera B or only to the film rewinding transmission mechanism C when the motor drive device MD is mounted on the camera B. These parts mentioned above jointly form a continuous shooting device. A coupler D1 is arranged to couple a power transmission mechanism disposed within the motor drive device MD with a power transmission mechanism disposed within the camera B when the motor drive device MD is mounted on the camera B. An electric connection terminal E1 is arranged to be connected to an electric connection terminal which is disposed on the side of the motor drive device MD.

The motor drive device MD, on the other hand, includes a second battery V2, a third motor M3, a power transmission mechanism K3 connected to the motor M3, a coupler D2 connected to the coupler D1 and also to the power transmission mechanism K3, the electric connection terminal E2 which is arranged to be connected to the electric connection terminal E1 of the camera B, an electronic circuit F consisting of a data communication circuit which is arranged to exchange signals with a motor control circuit which controls the motor M3 and an electronic circuit disposed within the camera B, and a mounting screw L which is arranged to be screwed into a screw hole provided in the bottom of the camera B in mounting the motor drive device MD on the camera B.

The motor drive device MD is thus arranged to serve as one of the components of the continuous shooting device of the camera B. A faster continuous shooting speed can be obtained with the motor drive device MD mounted on the camera B.

Figure 4:
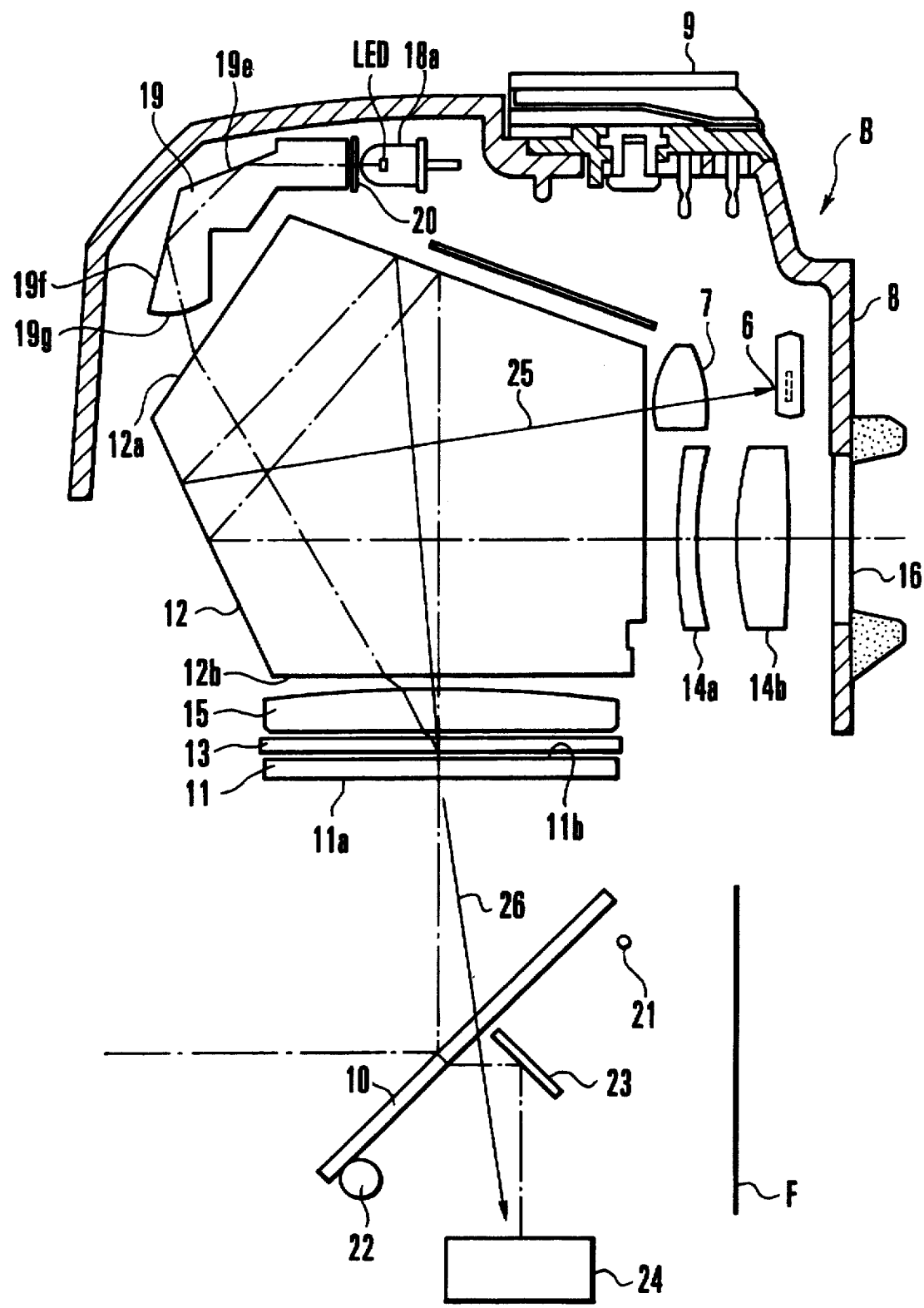
FIG. 4 is a sectional view showing a viewfinder optical system of the camera of FIGS. 3(a) and 3(b).
Figure 5:
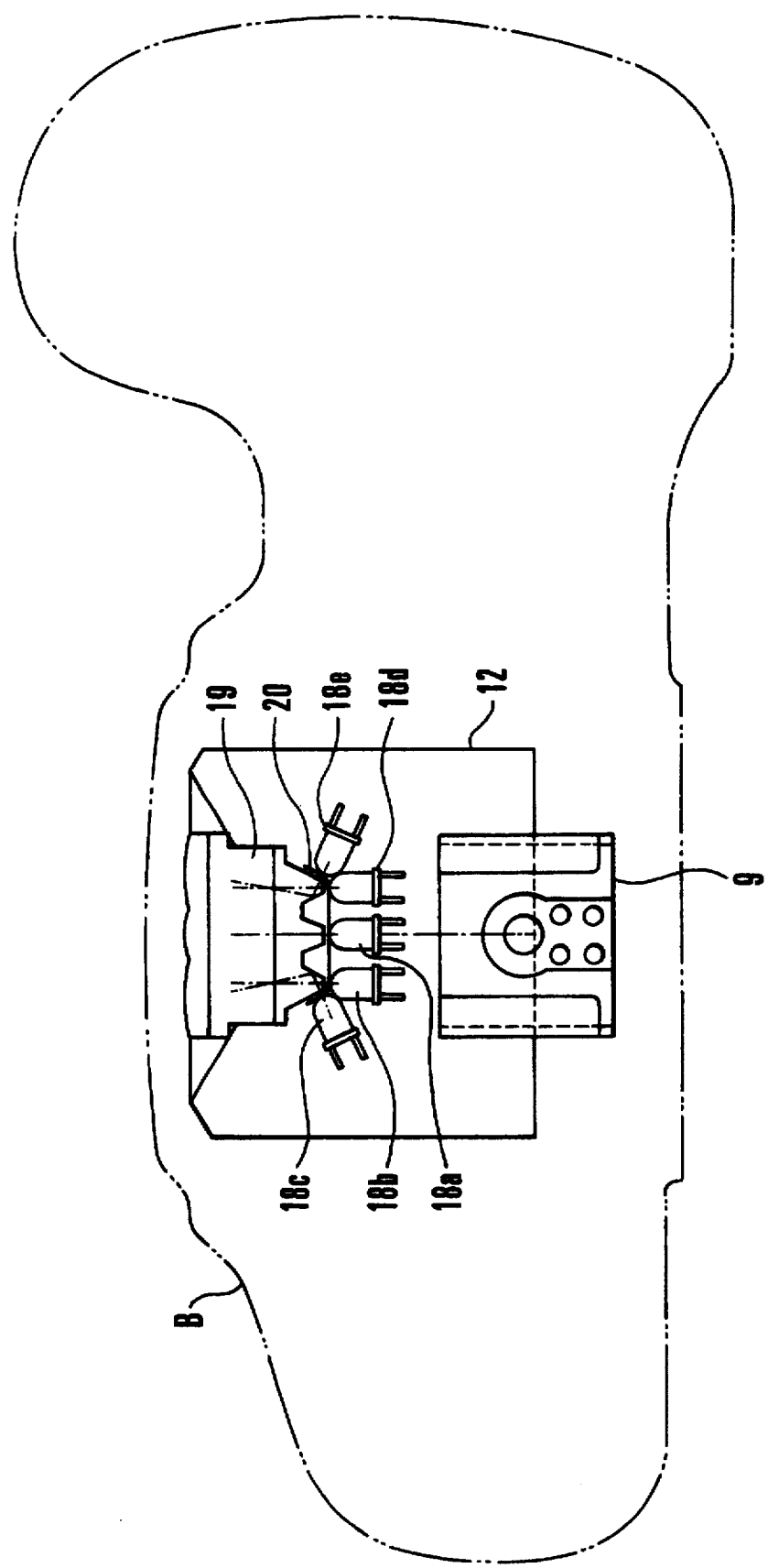
FIG. 5 is a top view showing the viewfinder optical system shown in FIG. 4.

A superimposed display system of the embodiment is arranged as described below:

FIGS. 4 and 5 show by way of example the arrangement of a single-lens reflex camera. FIG. 4 is a sectional view showing the camera as viewed from one side. FIG. 5 is a look-through view showing the camera as viewed from above. The illustrations include a single-lens reflex camera body B, a film F, a movable mirror 10 which is arranged to spring upward in exposing the film F to light, a focusing screen 11 which has a Fresnel lens 11a on its light incident side and a mat surface 11b on its light exit side, a reflection plate 13 which is provided with a display part for a superimposed display as will be described later herein, a condenser lens 15, a pentagonal roof prism 12, eyepieces 14a and 14b and a protection glass 16. These parts jointly form a viewfinder system. A reference numeral 21 denotes the center of rotation of the movable mirror 10 and a numeral 22 a stopper member.

A light measuring sensor 6 and a light measuring lens 7 are included in a light measuring circuit 512 which will be described later herein. A submirror 23 is arranged to be retracted from a photo-taking optical path along with the movable mirror 10. A distance measuring (focus detecting) sensor 24 forms a part of a distance measuring (focus detecting) circuit 513 which will be described later. A light projection lens 19 extends from an upper front part to an upper part of the pentagonal roof prism 12. On the upper part of the pentagonal roof prism 12 are mounted five LED packages 18a, 18b, 18c, 18d and 18e and a mask 20. The LED packages are respectively arranged to contain light emitting diodes (hereinafter referred to as LEDs) as light sources and to emit visible light. The LED light falls on the light projection lens 19 to be reflected there and to be condensed into a light flux. The light flux is then guided to the display part of the reflection plate 13 to allow the display part to make a superimposed display.

An upper cover 8 is arranged to cover these elements and is provided with an accessory shoe 9 for connection with a flash device or the like. The accessory shoe 9 is disposed right above the optical axis of a photo-taking lens, so that when the camera is held in a normal posture, the position of the accessory shoe 9 permits flash shooting with little shadows. The above-stated LED packages 18a to 18e are disposed between the apex of the pentagonal roof prism 12 and the accessory shoe 9, so that the upper cover 8 which is arranged to house these parts can be formed in the same shape as an ordinary single-lens reflex camera.

Figure 6:
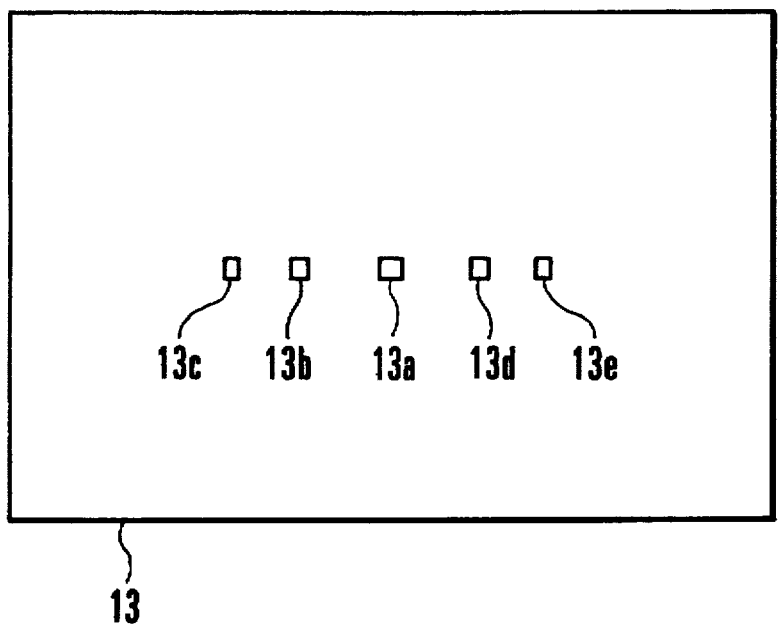
FIG. 6 is a front view showing the viewfinder field of the viewfinder optical system shown in FIG. 4.

Next, a viewfinder field of the camera which is provided with distance measuring field frames in the display part for a focus detecting device is described by way of example as follows:

FIG. 6 is a plan view showing in details the reflection plate 13 which is shown in FIG. 4. Referring to FIG. 6, the display part of the reflection plate 13 is provided with distance measuring field frames (representing focus detecting areas) 13a to 13e which indicate the positions of distance measuring (focus detecting) fields provided for a focus detecting device (not shown).

The viewfinder field of the camera includes an outer display part which is arranged outside of an object image display field to show shooting conditions such as a shutter speed, an aperture value, an exposure compensation amount, etc., and the distance measuring field frames 13a to 13e which are located inside of the object image field. The distance measuring field frames are arranged to be displayed in a state called a superimposed display which permits observation of the distance measuring field frames simultaneously with an object image.

Further, the display part for making the superimposed display may be provided on the focusing screen 11 instead of on the reflection plate 13.

Figure 7:
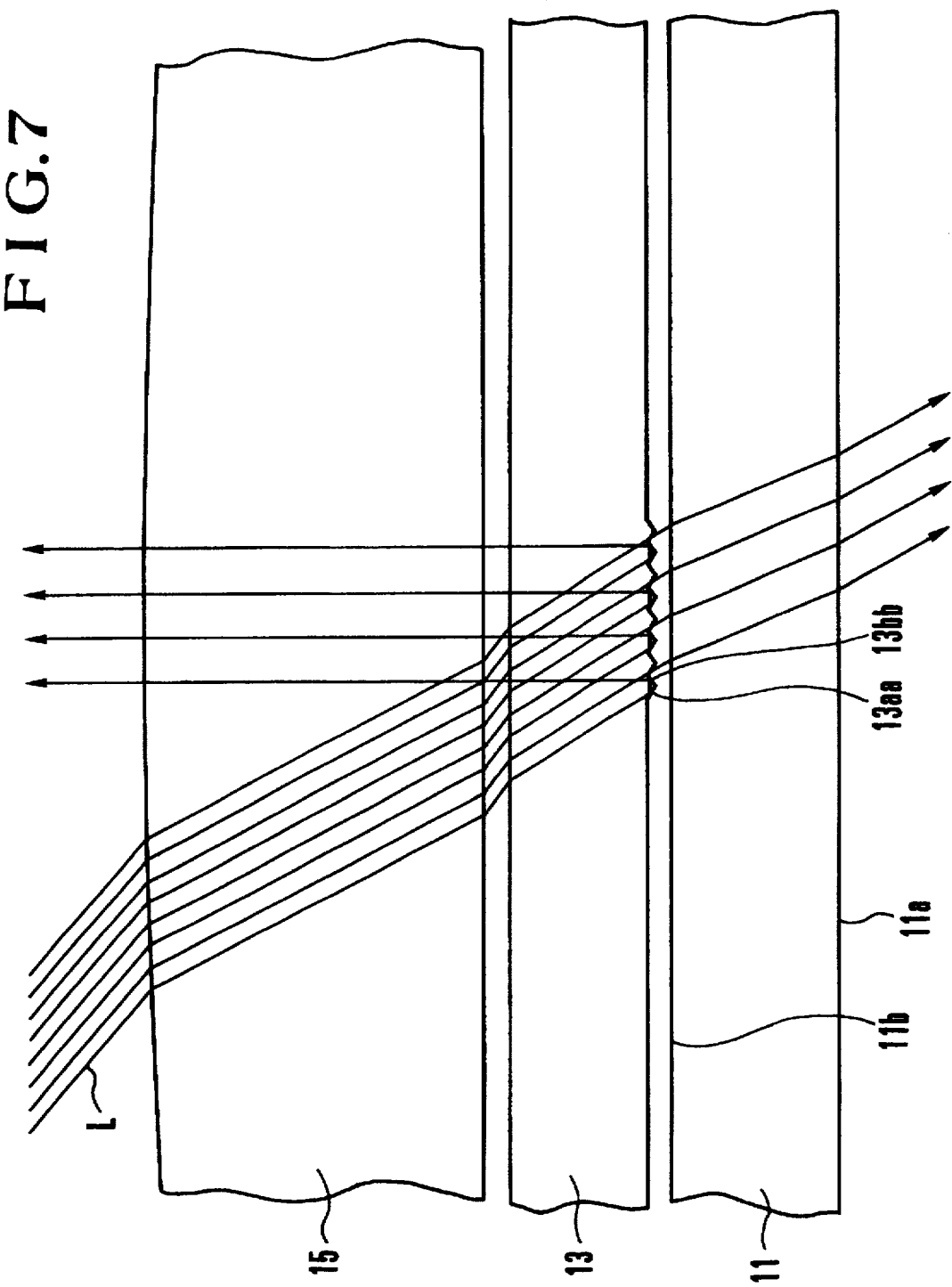
FIG. 7 is a sectional view showing the display principle of a superimposed display device disposed in the viewfinder optical system shown in FIG. 4.

The principle of the superimposed display is next described with reference to FIG. 7 as follows:

FIG. 7 is an enlarged sectional view of the distance measuring field frames 13a to 13e taken from one side. The distance measuring field frames 13a to 13e have longitudinal and transverse lines each of which consists of many minute prisms extending perpendicular to the surface of the paper of the drawing. The sectional shape of the distance measuring field frames shows an aggregation of triangular projections, each of which has one edge line. Therefore, a light flux which comes from a photo-taking lens (not shown) to be incident on the distance measuring field frames 13a to 13e is refracted there in such a way as to be deflected from the direction of the eyepieces 14a and 14b. Therefore, compared with a mat surface part 11b around them, they appear darker.

Further, when the distance measuring field frames 13a to 13e of the reflection plate 13 are conversely illuminated obliquely from above, a ray of light L incident on the reflection plate 13, for example, is totally reflected by a slanting face 13aa of the prisms forming the distance measuring field frames 13a to 13e, and, then, is totally reflected and directed upward by a slanting surface 13bb opposite to the surface 13aa. Meanwhile, a pencil of rays which is not incident on the prisms forming the distance measuring field frames 13a to 13e goes out through the focusing screen 11 toward the movable mirror 10 and is, therefore, not observed.

The distance measuring field frames 13a to 13e which are composed of minute prisms are thus arranged to have a characteristic of causing the rays of light obliquely incident from above to be deflected toward parts located right above them. Utilization of this characteristic makes it possible to vary the display color of the distance measuring field frames 13a to 13e by controlling an illumination light.

The illumination by the LEDs mentioned in the foregoing is made to realize a superimposed display in the above-stated manner. By using a red LED light, for example, a distance measuring field frame which normally appears in a black color can be selectively lit up in a red color when an in-focus state is obtained at the frame.

Again referring to FIGS. 4 and 5, a path through which a light flux emitted by the LED comes up to the reflection plate 13 is described in sequence as follows since the illuminating optical system is in a bilaterally symmetrical shape, the following description covers only an optical path which corresponds to the LED packages 18a, 18b and 18c.

Figure 8:
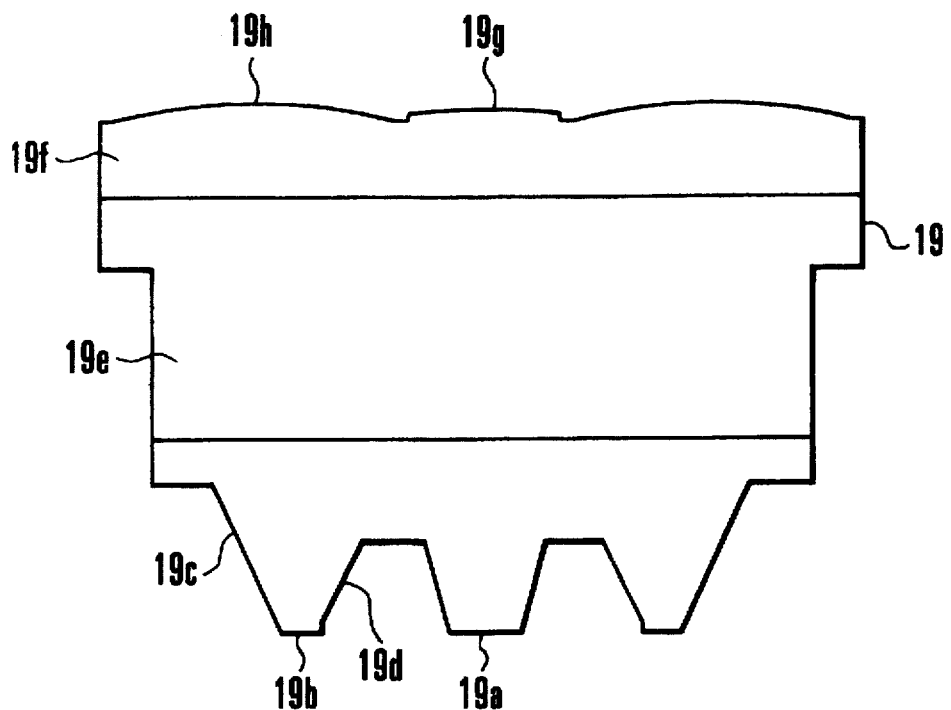
FIG. 8 is a plan view showing a light projecting lens of the superimposed display device shown in FIG. 4.
Figure 9:
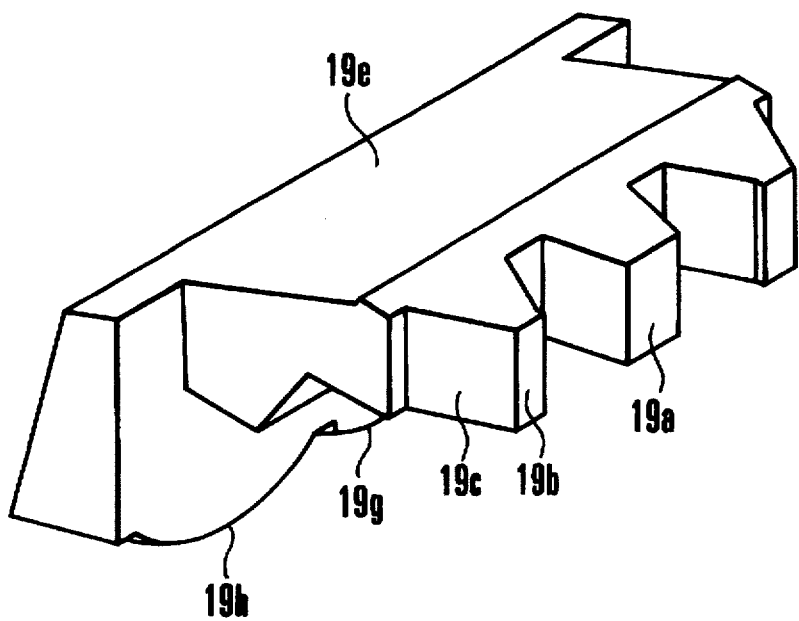
FIG. 9 is an oblique view showing the light projecting lens of the same superimposed display device.

The light flux emitted by the LED package 18a is narrowed by an aperture which is not shown but is provided in a mask 20. The light flux passed through the mask 20 comes to fall on the light projection lens 19. As shown in a detailed plan view in FIG. 8 and in an oblique view in FIG. 9, the light projection lens 19 has many divided faces of incidence. Of the faces, a face 19a is arranged to be an incidence face for the light flux coming from the LED package 18a. The light flux which enters the light projecting lens 19 from the face 19a is totally reflected by a face 19e and another face 19f which is located next to the face 19e. The light flux thus reaches a fore end lens part of the light projection lens 19 almost without loss. The optical path is bent by these reflection faces to make the illumination system into a shape extending along the upper part of the pentagonal roof prism 12.

The light projection lens 19 has three lens parts. For the light flux emitted from the LED package 18a, only a portion that passes through a lens part 19g becomes an effective light flux. In other words, light flux portions that pass other parts of the light projection lens 19 are never observed through the viewfinder as they are never directed toward the eyepieces 14a and 14b, even if they are reflected by some of the distance measuring field frames (display parts).

The lens part 19g acts to place the above-stated reflection plate 13 and the mask 20 in a projective relationship. The light flux exiting from the lens part 19g is condensed and comes to fall on the pentagonal roof prism 12 through its face 12a. After that, the incident light flux exits from another face 12b of the pentagonal roof prism 12 and passes through the condenser lens 15 to reach the distance measuring field frame 13a which is provided on the lower surface of the reflection plate 13. A light illuminating area on the reflection plate 13 is determined by the size of the above-stated aperture of the mask 20 and includes at least the distance measuring field frame 13a. The light illuminating area, however, is limited to a range not intruding into the adjoining distance measuring field frames 13b and 13d for preventing a ghost. The rays of light behave at the reflection plate 13 in the manner as described in the foregoing with reference to FIG. 7.

The lens part 19g is set at a size larger than the display size of the distance measuring field frame 13a. Therefore, when the distance measuring field frame (display part) on the reflection plate 13 is looked at through the viewfinder, the larger size of the lens part 19g ensures that some rays of light from the LED package 18a reach the eye even if the position of the eye happens to deviate from the optical axis to some extent.

The light emitted from another LED package 18b is next described as follows: the light from the LED package 18b is narrowed by the aperture provided in the mask 20 and then comes to fall on the light projection lens 19. Then, the face 19b of the light projection lens 19 serves as an incidence face for the light flux coming from the LED package 18b. The light flux thus having entered the light projection lens 19 is totally reflected by the face 19e and the next face 19f to be guided to the lens part of the light projection lens 19. In the totally reflected light flux, some portion that is incident on a lens part 19h of the light projection lens 19 becomes an effective light flux. The lens part 19h of the light projection lens 19 also acts to place the reflection plate 13 and the mask 20 in a projective relationship. A light flux exiting from the lens part 19h is condensed and caused to enter the pentagonal roof prism 12 through its face 12a. This light flux exits from the face 12b of the pentagonal roof prism 12 and reaches the distance measuring field frame 13b of the reflection plate 13 through the condenser lens 15. A light illumination area on the reflection plate 13 includes at least the distance measuring field frame 13b but is limited to a range not intruding into the adjoining distance measuring field frames 13a and 13c, for preventing ghosting.

The light which is emitted from the LED package 18c is narrowed by the aperture provided in the mask 20 and then comes to fall on the light projection lens 19. Then, the face 19c of the light projection lens 19 becomes an incidence face for the light flux coming from the LED package 18c. The light flux having entered the light projection lens 19 is first totally reflected by the face 19d of the light projection lens 19 to replace the light flux which comes from the LED package 18b. The layout of large LED packages can be made to be advantageous in terms of light quantity by virtue of the arrangement to replace the optical path in this manner. The absence of the total reflection face 19d would necessitate the LED package 18c to be inserted in between the LED packages 18a and 18b. Such arrangement would cause a salient decrease in quantity of light due to use of smaller LED packages.

The light flux reflected by the face 19d is totally reflected by the face 19e and the next face 19f to come to the fore end lens part of the light projection lens 19. Then, in the same manner as the light flux from the LED package 18b, a light flux portion incident on the lens part 19h becomes an effective light flux. The lens part 19h, as mentioned above, acts to put the reflection plate 13 and the mask 20 in a projective relationship. Therefore, the light flux exiting from the lens part 19h is condensed and comes to enter the pentagonal roof prism 12 from its face 12a. The light flux then exits from the face 12b of the pentagonal roof prism 12 to come to the distance measuring field frame 13c of the reflection plate 13 through the condenser lens 15. A light illumination area on the reflection plate 13 includes at least the distance measuring field frame 13c but is limited to a range not intruding into the adjoining distance measuring field frame 13b for preventing ghosting.

The light flux from the LED package 18b and the light flux from the LED package 18c are arranged to be projected through one and the same lens part 19h. This is because an area for one of these light fluxes overlaps an area for the other due to the narrowness of a spacing distance between the distance measuring field frames. In other words, in the case of the layout of the distance measuring field frames as in the case of this embodiment, if the viewfinder peeping position of the eye is allowed to have some latitude to make both the distance measuring field frames 13b and 13c observable, the passing areas of the LED light fluxes to be seen on the lens parts overlap each other between the distance measuring field frames. Therefore, the arrangement of providing a common lens part for a plurality of display parts makes a superimposed display possible even in cases where distance measuring fields are densely arranged. Then, it is possible to illuminate with light from an LED, for example, only a display part showing an in-focus state among distance measuring field frames or only some display part that is workable among others. This advantageous effect is attainable not only for the displays of distance measuring fields but also for other displays of varied kinds.

Further, the illumination light reflected and diffused through the reflection plate 13 and the focusing screen 11 comes to fall on the light measuring sensor 6 and the distance measuring (focus detecting) sensor 24 as indicated by optical paths 25 and 26. Therefore, if these sensors 6 and 24 perform their light receiving actions while the illumination is in process, signals outputted from these sensors would become inaccurate. Under such a condition, the light measuring action would result in an erroneous exposure value and the distance measuring action would result in an erroneous focus detection.

The internal electrical arrangement of the camera B and that of the motor drive device MD are next described with reference to FIG. 10.

Figure 10:
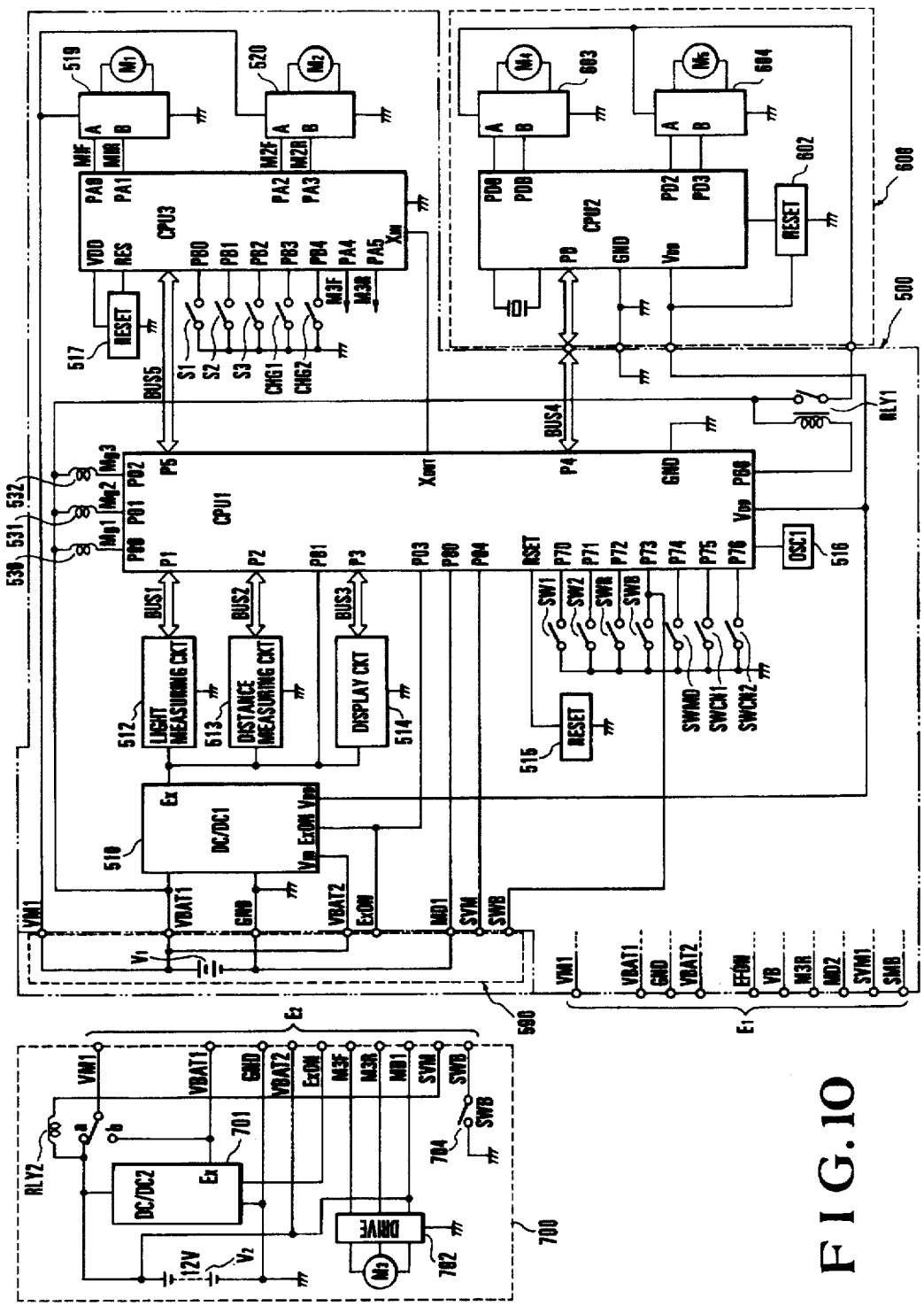
FIG. 10 is a circuit diagram showing a driving circuit of the camera shown in FIGS. 3(a) and 3(b).

In FIG. 10, a part encompassed with a two-dot-chain line denotes an electric circuit arranged within a camera body 500 excluding a lens barrel. A part 600 which is encompassed with a broken line denotes an electric circuit arranged within the lens barrel. A part 700 which is also encompassed with a broken line denotes an electric circuit arranged within the motor drive device MD. The electrical arrangement within the camera (body) 500 is first described as follows:

An attachable/detachable grip 590 is mounted on one side of the camera 500. A lithium battery V1 is disposed inside of the grip 590. Terminals VM1, VBAT1, GND, VBAT2, EXON, MD1, SVM, SWB, etc., are provided on a mounting face between the grip 590 and the camera 500.

The grip mounting face of the camera 500 is arranged to be used also for mounting the motor drive device 700 (MD). The motor drive device 700, therefore, can be mounted on the camera 500 after the grip 590 is removed. The connection terminals VM1, VBAT1, GND, — are arranged to be usable in common for the grip 590 and for the motor drive device 700.

Within the camera 500, there are various parts arranged in the following manner: a DC-DC converter 510 is arranged to serve as a constant voltage source for electronic circuits of varied kinds. A microcomputer CPU1 is arranged to control the sequence of camera actions of varied kinds. An oscillation circuit 516 is arranged to supply driving clock pulses to the microcomputer CPU1. A reset circuit 515 is arranged to supply a reset signal to the microcomputer CPU1. A light measuring circuit 512 is connected to a port P1 of the microcomputer CPU1 via a bus BUS1. A distance measuring (focus detecting) circuit 513 is connected to a port P2 of the microcomputer CPU1 via a bus BUS2. A display circuit 514 is connected to a port P3 of the microcomputer CPU1 via a bus BUS3. A motor driving circuit 519 is arranged to drive the motor M1. A motor driving circuit 520 is arranged to drive the motor M2. A control circuit CPU3 which is composed of a microcomputer is connected to a port P5 of the microcomputer CPU1 via a bus BUS5 and is arranged to control the motor driving circuits 519 and 520. An electromagnetic switch RLY1 is connected to a port P60 of the microcomputer CPU1 and is arranged to operate when the lens barrel 600 is mounted on the camera 500. A reset circuit 517 is arranged to supply a reset signal to the control circuit CPU3. An electromagnet 530 is arranged to release a shutter mechanism from a first clamped state in response to a shutter release operation. An electromagnet 531 is arranged to release a leading shutter curtain from a clamped state. An electromagnet 532 is arranged to release a trailing shutter curtain from a clamped state.

The display circuit 514 includes the above-stated five LEDs and is arranged to operate according to the instructions of the microcomputer CPU1 to adjust luminance in a manner which is, for example, disclosed in Japanese Laid-Open Patent Application No. HEI 3-65940, in such a way as to have superimposed displays to be observed always with an adequate brightness.

The distance measuring circuit 513 includes a distance measuring sensor 24 having five distance measuring fields which correspond to the five distance measuring field frames 13a to 13e shown in FIG. 6. The distance measuring circuit 513 is thus arranged to be capable of outputting a defocus amount of each of five places which are transversely aligned within a photo-taking image plane. The details of this arrangement are as disclosed in Japanese Laid-Open Patent Application No. HEI 5-323182 and are therefore omitted from the following description.

The microcomputer CPU1 is provided with input ports P70 to P76. These input ports are respectively connected to a switch SW1 which is arranged to turn on in response to an operation performed for starting light and distance measuring actions, a switch SW2 arranged to turn on in response to an operation performed for starting a shutter release action, a switch SWR arranged to respond to a start of film rewinding, a switch SWB arranged to detect the mounting of the grip 590 and that of the motor drive device 700, a switch SWMD arranged to turn off in response to the ascent of a mirror which is not shown (for bringing the viewfinder into a viewable state) and to turn on in response to the descent of the mirror (for bringing about an exposure permitting state), a switch SWCN1 arranged to turn off upon completion of the travel of the leading shutter curtain and to turn on upon completion of charging a leading-curtain moving mechanism, and a switch SWCN2 arranged to turn off upon completion of the travel of the trailing shutter curtain and to turn on upon completion of charging a trailing-curtain moving mechanism. A port P80 of the microcomputer CPU1 serves as battery voltage detecting means for detecting the terminal voltage of a battery V1 and that of a battery V2. The port P80 is connected to a connection terminal MD1 which is provided on an outside surface of the camera.

The control circuit CPU3 which is arranged to control the motors M1 and M2 has input ports PB0 to PB4. These input ports PB0 to PB4 are respectively connected to switches S1 to S3 which are provided for detecting information on the travel of a film in use and switches CHG1 and CHG2 which are provided for detecting the actions of a shutter charge transmission mechanism, etc. Further, two ports PA4 and PA5 of the control circuit CPU3 are arranged to be connected to a motor driving circuit 702 which is disposed within the motor drive device 700. When the motor drive device 700 is mounted on the camera, the ports PA4 and PA5 enable the control circuit CPU3 to control also the motor M3 which is disposed within the motor drive device 700.

Signals M1F, M1R, M2F, M2R, M3F and M3R shown at the ports PA0 to PA5 of the control circuit CPU3 indicate forward and reverse rotations of the motors, respectively.

The lens barrel 600 which is detachably mounted on the camera 500 contains, among others, a microcomputer CPU2 which controls all electrical control actions to be done within the lens barrel 600, a reset circuit 602 which is arranged to supply a reset signal to the microcomputer CPU2, a motor driving circuit 604 arranged to control a motor M5 (an automatic focusing motor) under the control of the microcomputer CPU2, and another motor driving circuit 603 which is arranged to control a motor M4 (a diaphragm driving motor) under the control of the microcomputer CPU2. The microcomputer CPU2 is connected via a bus BUS4 to the port P4 of the microcomputer CPU1 which is disposed within the camera 500. Further, the microcomputer CPU2 and the reset circuit 602 are arranged to receive a supply of power from a DC-DC converter 510 disposed within the camera via connection terminals which are arranged in the neighborhood of the mounting face between the camera 500 and the lens barrel 600. On the other hand, the motor driving circuits 603 and 604 are arranged to receive a supply of power from the battery V1 of the camera 500 via the electromagnetic switch PLY1 and the connection terminals.

The motor drive device (MD) 700 includes the above-stated battery V2 (a 12-volt battery consisting of eight AA dry cells, in the case of this embodiment), the above-stated motor M3, a motor driving circuit 702 which is arranged to drive the motor M3 and to be controlled by the microcomputer CPU2 disposed within the lens barrel 600, a DC-DC converter 701 which is arranged to output a constant voltage of 6 volts under the control of the microcomputer CPU1 disposed within the camera 500, an electromagnetic switch RLY2 which is arranged to switch the output from a terminal VM1 between a voltage of 6 volts or a voltage of 12 volts and to operate also under the control of a signal from the microcomputer CPU1, and a switch 704 which is arranged to turn on when the motor drive device (MD) 700 is mounted on the camera 500. On an outside surface of the motor drive device 700, there is arranged a connection terminal E2 which corresponds to the connection terminal E1 of the camera 500 and consists of terminals VM1 to SWB which are the same as those arranged on the side of the camera 500.

The meanings of symbols, commands and flags used for flow charts in FIGS. 11 to 14 are defined as follows:

MD: The motor drive device

AF: Automatic focusing

RLS: A sequence of releasing actions performed when the camera is used alone (without the motor drive device)

MDRLS: A sequence of releasing actions performed with the motor drive device mounted on the camera BC: A battery check (detection of battery voltage).

Data to be sent from the control circuit CPU3 to the microcomputer CPU1:

| flags | 0 | 1 | indicating |
|---|---|---|---|
| DCF | SWS2 on | SWS2 off | Film rewinding by one frame is detected. |
| HLF | Low mode | High mode | Discrimination of film transport mode |
| CHGF | Charge finished | Charge not finished | Indicates mechanical charging state |
| FLMF | Film winding finished | Film winding not finished | Indicates film charging state |
| M3F, M2F and M1F | In repose | In process | Indicate states of motors |
| The flag of the microcomputer CPU1: | | | |
| BCF | High voltage | Low voltage | State of battery voltage |

The internal actions of the electronic circuits and the actions of mechanical structural parts are described in outline below with reference to FIGS. 1 and 2.

(i) In a case where the camera is used alone:

As mentioned in the foregoing, the camera of this embodiment is provided with a built-in motor drive device and is thus arranged to be capable of carrying out a continuous shooting operation at a low speed. In this instance, the reduction ratio of the film winding mechanism K1 which is arranged to be driven by the motor M1 is set according to the voltage of the battery. Meanwhile, the film rewinding/shutter charging transmission mechanism K2 is arranged to transmit the power of the motor M2 to a shutter charging transmission system in winding the film and to a fork which engages a film cartridge in rewinding the film. The power source is the battery V1 the voltage of which is 6 volts.

In carrying out low-speed continuous shooting, the motors M1, M2, M4 and M5 and electromagnets Mg1, Mg2 and Mg3 are energized and the superimposed display is lighted up, as shown by a timing chart in FIG. 2.

Referring to FIG. 2, after a battery check is made by energizing the electromagnets 531 and 532, the electromagnet 530 is energized to retract the movable mirror 10 from the photo-taking optical path, i.e., to shift its viewfinder observable position to an exposure permitting position. At the same time, the motor M4 is driven to stop down the diaphragm aperture of the phototaking lens to a position corresponding to a desired aperture value. After that, the electromagnets 531 and 532 are energized to carry out an exposure action on the film. The position of the movable mirror 10 is then brought back to the viewfinder observable position by operating the electromagnet 530. The motor M4 is controlled to fully open the diaphragm aperture. The motor M2 is caused to initiate a shutter charging action.

After the diaphragm is fully opened by the motor M4, the motor M1 is caused to wind the film. A superimposed display is made after the movable mirror 10 has stabilized in the viewfinder observable position. After the superimposed display is lighted up for a predetermined period of time, the distance and light measuring circuits 513 and 512 which have light receiving means are caused to begin their light receiving actions.

The superimposed display and the action of returning the movable mirror 10 are thus performed in a time serial manner. Unlike an operation to be performed with the motor drive device mounted as will be described later, a time interval of shooting between a first frame and a second frame is sufficiently long to obviate the necessity of overlapping the exposure action and the superimposed display. Therefore, a preference is afforded to the observability.

In other words, to make a superimposed display after waiting for the return of the movable mirror 10 to the viewfinder observable position means that there is a timing in which the movement of an object image as viewed through the viewfinder is stopped and an image obtained in a state of having a display part superimposed thereon can be completely seen. Therefore, the essential function of a superimposed display mentioned in the beginning of the present specification can be fulfilled. To ensure a more sufficient recognition, the display is preferably lighted up for more than 25 ms.

(ii) When the motor drive device is used by mounting it on the camera:

The motor drive device is a component of the continuous shooting system and permits continuous shooting at a high speed. The motor drive device is mounted on the camera after the grip 590 is removed from the camera. The camera is electrically connected to the motor drive device through the connection terminals. The mounting of the motor drive device is electrically detected. Then, the battery V2 acts as a power source to supply power (12 volts) to the electronic circuits arranged on the side of the camera.

The instant the motor drive device is mounted, the shutter charging transmission system C in the power transmission mechanism K2 is connected to the power transmission mechanism K3 disposed within the motor drive device, while the film rewinding transmission system R is connected only to the motor M2. The reduction ratio of the film winding mechanism K1 and that of the power transmission mechanism K3 of the motor drive device are set either at a high speed reduction ratio or a low speed reduction ratio according to the voltage of the battery V2. The reduction ratio is set at the high speed reduction ratio if the voltage is higher than a predetermined value and at the low speed reduction ratio if the voltage is lower than the predetermined value.

Since the motors M1 and M3 receive the supply of power from the battery V2 disposed within the motor drive device, the motor M1 normally becomes capable of driving at a higher speed than when the camera is used alone. The shutter charging transmission system C which is arranged to be driven by the motor M3 is also driven at a higher speed than when the camera is used alone.

In a case where the reduction ratio of the film winding mechanism K1 and that of the power transmission mechanism K3 are set at the high speed, the timing of energizing the motors M1, M3, M4 and M5 and the electromagnets Mg1 (530) and Mg2 (531) and the timing of lighting up the superimposed display become as shown in the timing chart of FIG. 1. More specifically, after the battery check is made by energizing the electromagnets 531 and 532, the movable mirror 10 is retracted to the exposure permitting position by energizing the electromagnet 530. Then, at the same time, the diaphragm aperture of the photo-taking lens is controlled by the motor M4. An exposure is effected after the control over the aperture. Upon completion of the exposure, the movable mirror 10 is brought back to the viewfinder observable position by the electromagnet 530, the diaphragm aperture is fully opened by the motor M4, the shutter is charged by the motor M3, and film winding by the motor M1 begins. Further, after the lapse of a predetermined period of time from the commencement of returning the movable mirror 10 by the electromagnet 530, a superimposed display is made while the movable mirror 10 is still in motion of returning. When the diaphragm is brought back to its full open aperture position by the motor M4 and the superimposed display for a predetermined period of time comes to an end, the distance and light measuring circuits 513 and 512 which have light receiving means begin to do their light receiving actions.

The lapse of the predetermined period of time from the commencement of returning the movable mirror 10 corresponds to a time within a length of time required for the process of returning the movable mirror 10 into a viewfinder optical path or a time within a length of time required for stabilizing the movable mirror 10 into a predetermined position for guiding a light flux to the viewfinder optical system, i.e., a time within a period of time required before the mirror 10 ceases to bound after its impingement on the stopper member 22. A superimposed display is thus arranged to be made with the lapse of this period of time used as a starting point of the display. In order to secure a length of time required for enabling the light measuring sensor 6 and the distance measuring sensor 24 to receive light, the timing of the exposure action and that of the superimposed display must be caused to overlap each other by this arrangement, because the shooting time interval between one frame and the next frame is extremely short.

The movable mirror 10 actually bounds or bounces to vibrate several times before it stabilizes in position when it comes to abut on the stopper member 22 which is provided in a position for guiding a light flux to the viewfinder optical system. The period of time required for returning the movable mirror 10 includes a length of time of 30 to 80 ms before the initial abutment and another length of time 40 to 80 ms before it ceases to vibrate. Strictly speaking, at that time, the object image is seen as vertically moving within the viewfinder, because the superimposed display is made while the movable mirror 10 is in motion. However, this problem can be substantially mitigated by setting the timing of lighting up the display at a point of time during the vibration of the movable mirror 10 mainly taking place toward the end of a working range. In this instance, the timing of lighting up is preferably set after the lapse of 30 to 100 ms from the commencement of returning the movable mirror 10. For high speed continuous shooting, the lower limit of the length of time for lighting up the display is set at about 20 ms and the upper limit at about 50 ms.

Further, if the operating timing of the superimposed display is too early, the movable mirror 10 would be illuminated while it is in process of retraction with the illumination light coming from on the side of the pentagonal roof prism 12. The focusing screen 11 then would be illuminated with the light reflected by the movable mirror 10. As a result, ghosting is generated too much for practical use of the display. At such timing, the object image is of course moving fast on the image plane at a hardly visible brightness and also in a blurred state to render the superimposed display meaningless. Therefore, the relation between the phase of the movable mirror 10 and the time of the illumination is very important.

As described above, importance is attached to the speed for a high-speed continuous shooting operation of the camera to be performed with the motor drive device mounted, and to the observability of a superimposed display in the case of a low-speed continuous shooting operation to be performed with the camera used alone. The camera is thus arranged to be automatically set in an optimum state according to the shooting condition.

Further, in a case where the reduction ratio of the film winding mechanism K1 and that of the power transmission mechanism K3 are set for a low speed with the voltage of the battery V2 being lower than a predetermined value, the operation is performed according to the timing chart shown in FIG. 2 in the same manner as in the case of using the camera alone. Importance is thus attached to the speed when the power supply voltage permits high-speed continuous shooting, and to the observability of a superimposed display in the event that the power supply voltage compels low-speed continuous shooting.

The operation of the camera is next described in detail with reference to FIGS. 11 to 14 which are flow charts. These flow charts represent programs stored in a ROM disposed within the microcomputer CPU1.

At a step ST1, all flags and all output ports are set at "0". At a step ST2, the input port P80 is checked for its voltage. If the voltage is found to be at 2 volts or more, the motor drive device MD is considered to have been mounted and the flow of operation proceeds to a step ST3A. The input voltage becomes 0 volt in a case where a battery of 6 volts is set. In that case, the motor drive device MD is considered to be not mounted and the flow proceeds to a step ST4.

At the step ST3A, data for charging the motor M3 at a low gear is sent to the control circuit CPU3 via the bus BUS5. The motor M3 is caused by the control circuit CPU3 to reversely rotate. The reverse rotation of the motor M3 sets the reduction ratio within the motor drive device MD at a ratio for a low speed and also tentatively actuates the shutter charging transmission system disposed within the camera through the couplers D1 and D2. At a step ST3B, a check is made to find if the charging action is adequately carried out with the couplers D1 and D2 correctly coupled. If the charging action is finished (CHGF=0), the flow of operation comes to the step ST4. If not (CHGF=1), the flow comes to a stop.

At the step ST4, the film rewinding switch SWR is checked for its state. If the switch SWR is found to have been pushed and turned on, the flow comes to the process of film rewinding (REWIND). If not, the flow comes to a step ST5. At the step ST5, the switch SW1 is checked to find if it has been pushed and turned on. If so, the flow comes to a step ST6. If not, the flow comes back to the step ST4. At the step ST6, the microcomputer CPU1 sets the (voltage) level of its output port P03 at a low level "L" to render the DC/DC converter 510 operative. As a result, a signal 5 V is outputted to the output Ex of the DC/DC converter 510. Then, the microcomputer CPU1 makes a check for the voltage of its port P81. Upon detection of that the signal 5 V is outputted, the level of the output port P60 is set at a low level "L" to turn on the electromagnetic switch RLY1. The power supply voltage VBAT is supplied to the lens barrel 600 and the flow of operation comes to a step ST7.

At the step ST7, the microcomputer CPU2 communicates with the microcomputer CPU2 via the bus BUS4 to receive the intrinsic data of the lens. The flow then comes to a step ST8. At the step ST8, the light and distance measuring circuits 512 and 513 are actuated via the buses BUS1 and BUS2. Then, data is received from them and an arithmetic operation is carried out for AF (automatic focusing). AF data thus obtained is sent to the microcomputer CPU2 via the bus BUS4. The AF motor M5 is then actuated to perform AF driving. Further, in accordance with light measurement data, an arithmetic operation for AE (automatic exposure) is carried out. The result of the operation is sent to the display circuit 514 via the bus BUS3 for a display.

At a step ST9, a check is made to find if the switch SW1 has been pushed to turn it on. If so, the flow comes to a step ST10. If not, the flow comes to a step ST11. At the step ST10, a check is made to find if the switch SW2 has been pushed to turn it on. If so, the flow comes to a step ST12 (shown in FIG. 2(a)). If not, the flow comes back to the step ST6. At the step ST11, the output port P03 is set at a high level "H" to turn off the DC/DC converter 510. The flow then comes back to the step ST4.

At the step ST12, a check is made to find if the motor drive device MD is mounted. If so, the flow comes to a subroutine MDRLS (shown in FIG. 13). If not, the flow comes to a step ST13.

At the step ST13, a battery check is made for its voltage. If its voltage is found to be 3 volts or more, the flow comes to a step ST14. If not, the flow comes to a step ST30 (STOP). At the step ST30, a display is made on the camera to indicate a low voltage state. At a step ST31, the flow of operation is bought to a halt.

At the step ST14, the output port P00 is set at a low level "L" for 10 ms and the electromagnet Mg1 is energized to move the movable mirror 10 upward to an exposure permitting position. An aperture control signal is sent via the bus BUS4 to control an aperture stopping down action by actuating the motor M4. At a step ST15, an instruction for stopping the driving action of the AF motor M5 is sent via the bus BUS4 to bring the AF action to a stop.

At a step ST16, exposure control is performed by sending pulse signals to the output ports P01 and P02 according to a shutter time. At a step ST17, the output port P00 is set at a low level "L" for 10 ms to move the movable mirror 10 down to its viewfinder observable position by energizing the electromagnet Mg1. At a step 18A, the battery is checked for its voltage. If the voltage is found to be 4 volts or more, the flow comes to a step ST19. If not, the flow comes to a step ST18B.

At the step 18B, the flag BCF is set at "1" and the flow comes to the step ST19. At the step ST19, an aperture opening instruction is sent to the microcomputer CPU2 via the bus BUS4. At a step ST20, an instruction for the forward rotation of the motor M2 is sent to the control circuit CPU3 via the bus BUS4 to charge the shutter. At a step ST21, the flow waits for arrival of information on the end of the aperture opening action from the microcomputer CPU2.

At a step ST22A, an instruction for driving the motor M1 is sent to the control circuit CPU3 via the bus BUS5. The motor M1 makes forward rotation or reverse rotation according to the value of the flag BCF. The reduction ratio of the film winding system is selected according to the voltage level of the battery and the film is wound up accordingly.

At a step ST22B, a superimposed display is made by deciding the luminous intensity of light emission on the basis of the light measurement output last obtained and by instructing via the bus BUS3 the display circuit 514 to light up an applicable LED.

The embodiment is arranged to select one of the LEDs corresponding to a distance measuring field decided according to the output of the distance measuring circuit 513 in the same manner as disclosed in Japanese Laid-Open Patent Application No. HEI 6-82678.

The arrangement may be changed to have a desired LED selected by an input operation of the photographer as disclosed in Japanese Laid-Open Patent Application No. HEI 1-288845. Further, the returning of the movable mirror 10 at the step ST17 and the aperture opening action are finished at about the same time. The LED is, therefore, lighted up when the image appearing in the viewfinder becomes substantially stable after the movable mirror 10 is moved down.

At a step ST22C, after the LED is lighted up, the light measuring circuit 512 and the distance measuring circuit 513 are instructed via the buses BUS1 and BUS2 to perform light and distance measuring actions.

At a step ST23, the flow waits for arrival of information on the end of the action of the motor M2 (M2F=0) from the control circuit CPU3. At a step ST24, a check is made to find if the shutter charging action has been finished. If so (CHGF=0), the flow comes to a step ST25. If not (CHGF=1), the flow comes to a stop.

Figure 11:
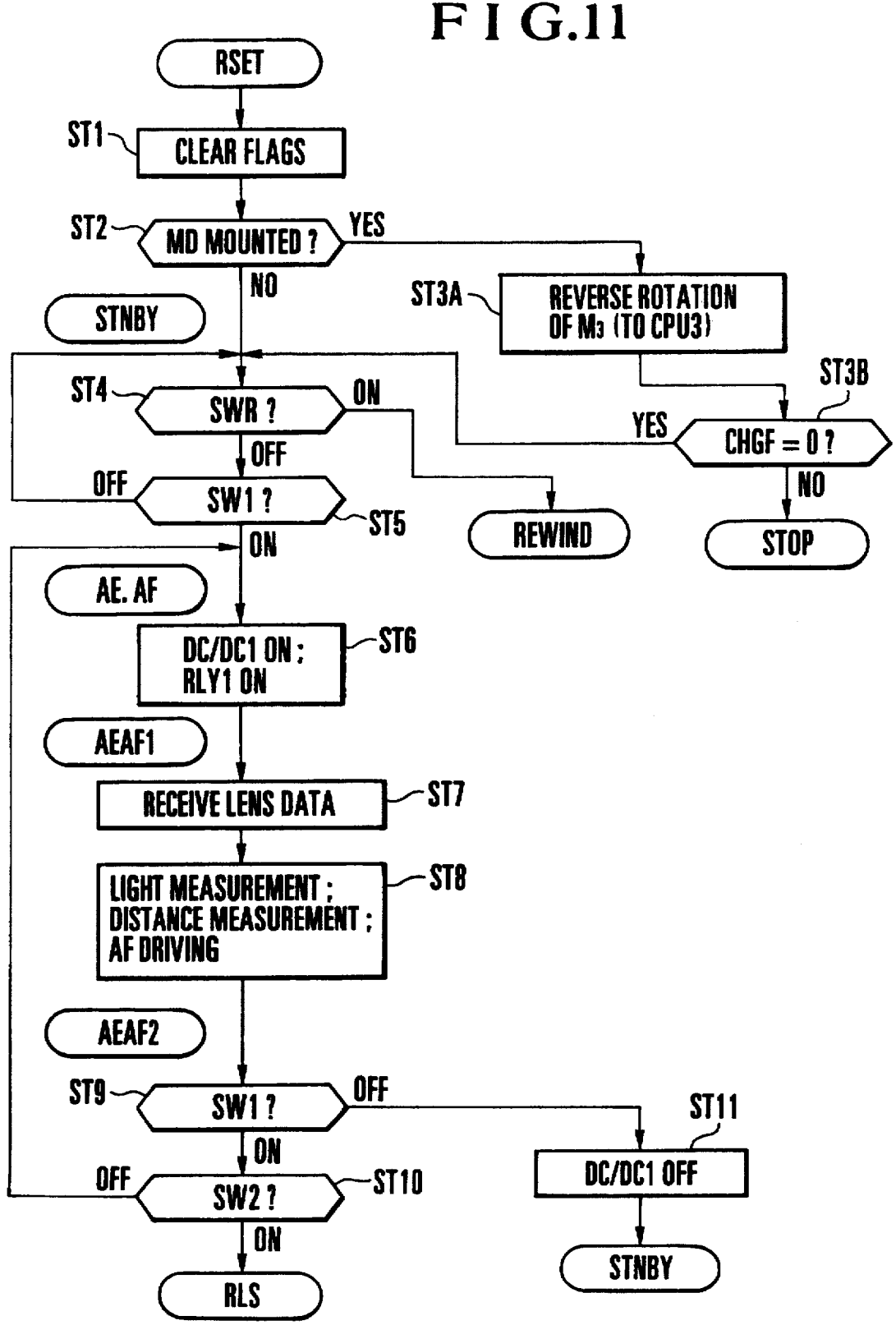
FIG. 11 is a flow chart showing an operation of the driving circuit of the camera shown in FIG. 10.

At a step ST25, the microcomputer CPU2 is instructed via the bus BUS4 to drive the lens. At a step ST26, the flow waits for arrival of information on the end of the action of the motor M1 (M1F=0) from the control circuit CPU3. At a step ST27, a check is made to find if a film charging action has been finished. If so (FLMF=0), the flow comes back to the step ST7 (FIG. 11). If not (FLMF=1), the flow comes to a subroutine REWIND.

A sequence of release processes to be performed with the motor drive device MD mounted (MDRLS) is next described with reference to FIG. 13 as follows:

At a step ST40, a check is made for the voltage of the battery. If the voltage is found to be 5 volts or more, the flow comes to a step ST41. If not, the flow comes to a stop. At the step ST41, the output port P00 is set at a low level "L" for 10 ms to move the movable mirror 10 upward by energizing the electromagnet Mg1. At the same time, an aperture control signal is sent via the bus BUS4 to carry out stopping down control over the diaphragm aperture by actuating the motor M4. At a step ST42, the flow waits for arrival of information on the end of the action of the motor M1 (M1F=0) from the control circuit CPU3. At a step ST43, a check is made for the completion of film charging. If the action has been finished (FLMF=0), the flow comes to a step ST44. If not (FLMF=1), the flow proceeds to the subroutine REWIND. At the step ST44, an instruction is sent via the bus BUS4 to bring the AF to a stop by stopping the AF motor M5 from driving. At a step ST45, exposure control is performed by sending pulse signals to the output ports P01 and P02 according to the shutter time.

At a step ST46A, the output port P00 is set at a low level "L" for 10 ms to move the movable mirror 10 downward by energizing the electromagnet Mg1. At a step ST46B, a timer is started for lighting up a superimposed display 50 ms after the commencement of the returning action of the movable mirror 10. At a step ST47, the battery is checked for its voltage. If the voltage is 7 volts or more (a third level), the flow comes to a step ST48. If not, the flow proceeds to a step ST60 (shown in FIG. 14).

At the step ST48, the microcomputer CPU2 is instructed via the bus BUS4 to fully open the aperture. At a step ST49, the control circuit CPU3 is instructed via the bus BUSs to charge a mirror driving mechanism by driving the motor M3. At a step ST50A, the control circuit CPU3 is instructed via the bus BUS5 to wind the film by driving the motor M1. At a step ST50B, the flow waits for an end of the 50 ms time count by the timer. The time count of the timer comes to the end while the movable mirror 10 is still in process of being returned by the returning action of the step ST46A and immediately before the movable mirror 10 comes to impinge on the stopper member 22 for the first time.

At a step ST50C, the luminous intensity of the light emission of the LED is decided on the basis of the light measurement output last obtained. Then, the display circuit 514 is instructed via the bus BUS3 to light up an LED selected from among other LEDs. The LED to be lighted up is selected in the same manner as at the step ST22B. With the LED lighted up at this timing, the returning action of the movable mirror 10 and the making of a superimposed display are performed in the overlapping manner by which this invention is characterized.

At a step ST51, to avoid any adverse effect on the light and distance measuring actions to be performed after this step, the flow waits until completion of the aperture opening action and that of the superimposed display. At a step ST52, a check is made to find if the switch SW1 has been pushed and turned on. If so, the flow comes to a step ST53. If not, the flow comes to a step ST54. At the step ST53, a light measuring action, a distance measuring action and an AF driving action are carried out. At the step ST54, a check is made to find if the motor M3 is in repose. If so, the flow comes to a step ST55. If not, the flow comes back to the step ST52.

At the step ST55, a check is made to find if a mechanism charging action has been finished. If so (CHGF=0), the flow comes to a step ST56. If not (CHGF=1), the flow comes to a stop. At the step ST56, a check is made to find if the switch SW2 has been pushed and turned on. If so, the flow comes to the step ST40. If not, the flow comes to a step ST57. At the step ST57, the flow waits for arrival of information on the end of the action of the motor M1 from the control circuit CPU3 (M1F=0).

At a step ST58, a check is made to find if the film charging action has been finished. If so (FLMF=0), the flow comes back to the standby step ST4. If not (FLMF=1), the flow proceeds to the subroutine REWIND.

Figure 14:
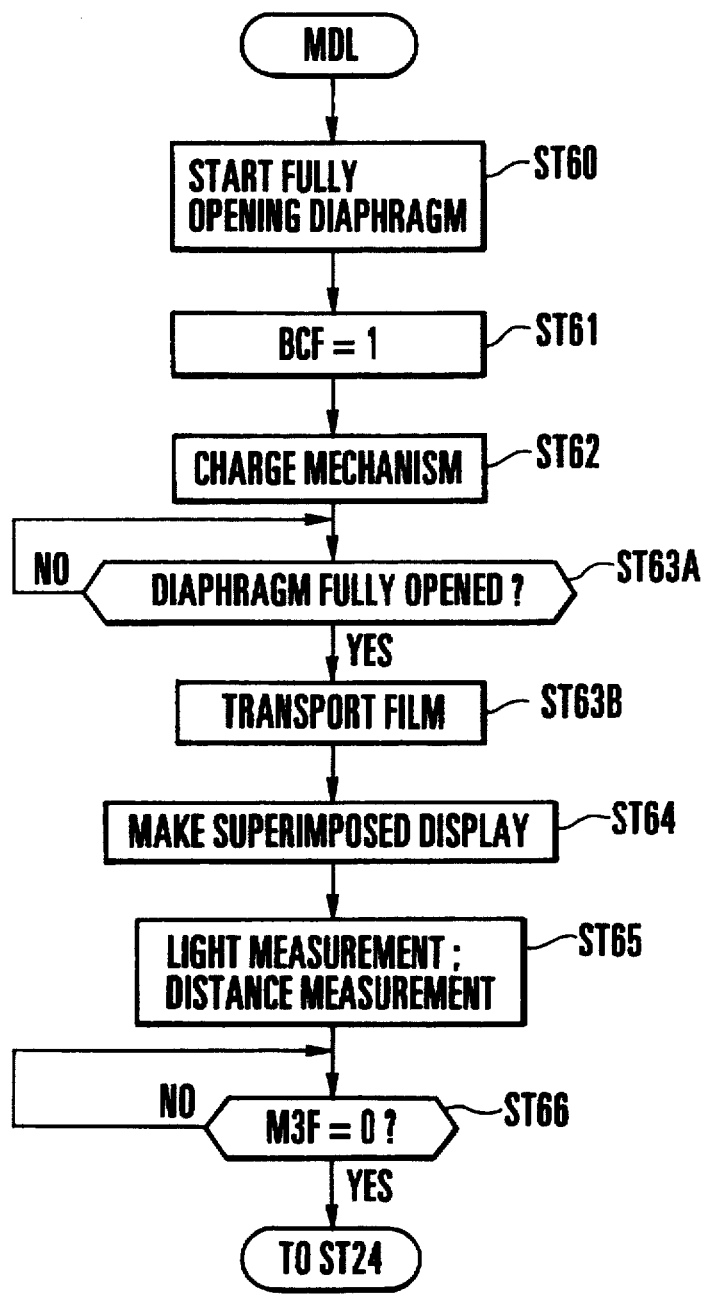
FIG. 14 is a flow chart showing an operation of the same driving circuit of the camera shown in FIG. 10.

Referring next to FIG. 14, a flow of operation to be performed in an MDL mode, in which the reduction ratio of the power transmission mechanism K3 is set at a reduction gear ratio for a low speed with the motor drive device mounted on the camera, is described below.

At a step ST60, the microcomputer CPU2 is instructed via the bus BUS4 to fully open the aperture. At a step ST61, the flag BCF is set at "1". At a step ST62, the control circuit CPU3 is instructed via the bus BUS5 to perform a mechanism charging action by driving the motor M3. Since the flag BCF is at "1", the mechanism charging action is performed at a reduction gear ratio for a low speed. At a step ST63A, the flow waits for arrival of information on the end of the aperture opening action from the microcomputer CPU2. At a step ST63B, the control circuit CPU3 is instructed via the bus BUS5 to perform a film charging action by driving the motor M1. Then, since the flag BCF is at "1", the film charging action is performed at a reduction gear ratio for the low "L" speed.

At a step ST64, the luminous intensity of the light emission by the LED is decided on the basis of the light measurement output last obtained and the display circuit 514 is instructed via the bus BUS3 to light up the LED. The process of returning the movable mirror 10 executed by the step ST46A and the aperture opening action are finished at about the same time. Therefore, the LED can be lighted up when the image obtained at the viewfinder becomes stable after completion of the descent of the movable mirror 10.

At a step ST65, after completion of lighting up the LED, the light measuring circuit 512 and the distance measuring circuit 513 are instructed via the buses BUS1 and BUS2 to perform their light and distance measuring actions. At a step ST66, the flow waits for the arrival of information on the end of the action of the motor M3 (M3F=0) from the control circuit CPU3. The flow comes to the step ST24 after arrival of the end of the action.

In the flow of operation described above, the steps ST46A to ST51 mainly constitute a first feature of this invention. The steps ST21 to ST22B, after branching of the flow in the direction of "NO" at the step ST12, and the steps ST63A to ST64, after branching of the flow in the direction of "NO" at the step ST47, constitute a second feature of this invention.

The arrangement of projecting a display light mainly at the end of the process of moving the movable mirror of a single-lens reflex camera downward (back to a viewfinder observable position) enables the single-lens reflex camera to make a light-emitting type superimposed display without retarding the distance and light measuring actions which are to be allowed to begin after the movable mirror settles down. The speed of continuous shooting, therefore, can be retained at a high speed to keep the conventional camera function unimpaired.

Further, the above stated action is arranged to apply only when the camera system is in a state of being capable of moving at a maximum high speed. By virtue of that arrangement, the observability of displays is never meaninglessly lowered at the time of continuous shooting at a low speed.

As described in the foregoing, the action of projecting a light at the display device is performed either while the movable mirror is still in returning motion within the viewfinder optical path or within a period of time of settling down in its predetermined position for guiding a light flux to the viewfinder optical system. Then, after completion of light projection, the light receiving means mentioned in the foregoing is allowed to perform a light receiving action. The invented arrangement gives the following advantages:

(i) A light-emitting type superimposed display can be made without impairing the speediness of continuous shooting even when the continuous shooting is in process. Therefore, even while the camera is in process of continuous shooting, the following advantages of the light emitting type superimposed display are unimpaired:

○ the photographer seldom fails to notice the display as the display is lighted up;

○ the color of the display has a great amount of latitude; and

○ a good observability is assured even when the object of shooting has a low degree of luminance.

In a case where the continuous shooting speed is set at a high speed with the motor drive device mounted, the light projecting action at the display device is performed either while the movable mirror is still in motion of returning into the viewfinder optical path or within a period of time during which it settles down in its position set for guiding a light flux to the viewfinder optical system and, after completion of light projection, the light receiving means is allowed to perform the light receiving action. In a case where the continuous shooting speed is set on the low speed side, the light projecting action at the display device is arranged to be performed after the movable mirror is moved back into the viewfinder optical path and the light receiving means is allowed to perform the light receiving action after completion of the light projecting action. This arrangement give the following advantage:

(ii) The operation of the camera is performed with a preference given to the speed in carrying out high-speed continuous shooting and to the observability of the superimposed display in the case of low-speed continuous shooting. The speed is thus automatically set according to the condition of shooting.

Further, the speed of continuous shooting with the motor drive device mounted is arranged to be switched from one speed over to the other according to the voltage of the power supply. When the continuous shooting speed is set on the high speed side, the light projecting action of the display device is performed at least either while the movable mirror is still in motion of returning into the viewfinder optical path or within a period of time during which it settles down in its position set for guiding a light flux to the viewfinder optical system and, after completion of light projection, the light receiving means is allowed to perform the light receiving action. If the continuous shooting speed is set on the low speed side, the light projecting action of the display device is arranged to be performed after the movable mirror is moved back into the viewfinder optical path and the light receiving means is allowed to perform the light receiving action after completion of the light projecting action. That arrangement gives the following advantage (iii) If the power supply voltage permits high-speed continuous shooting, a preference can be given to the speed. If the power supply voltage necessitates low-speed continuous shooting, importance can be attached to the observability of the superimposed display.

What is claimed is:

1. A camera comprising:
    a movable mirror arranged to be switched between a first position in which an image light flux is guided to a viewfinder optical system and a second position in which an exposure can be carried out by image pickup means;
    a display device arranged to make a display by superimposing a light from a light source on an image obtained within a viewfinder; and
    a control circuit arranged to cause said light source to begin to light up during the movement of said movable mirror from the second position to the first position after exposure.

2. A camera according to claim 1, wherein said display device is arranged to make the display observable through said viewfinder by guiding a light emitted by said light source to said viewfinder optical system.

3. A camera according to claim 2, wherein said display device is arranged, to cause the light emitted by said light source to be projected on a focusing screen within said viewfinder optical system.

4. A camera according to claim 1, further comprising a light receiving device arranged to receive at least a part of said image light flux.

5. A camera according to claim 4, wherein said light receiving device is arranged to begin performing a light receiving action after said control circuit stops said light source from lighting up.

6. A camera according to claim 4, wherein said light receiving device is arranged to perform a light measuring action.

7. A camera according to claim 4, wherein said light receiving device is arranged to perform a focus detecting action.

8. A camera according to claim 5, wherein said light receiving device is arranged to perform a light measuring action.

9. A camera according to claim 5, wherein said light receiving device is arranged to perform a focus detecting action.

10. A camera comprising:
   a movable mirror arranged to be switched between a first position in which an image light flux is guided to a viewfinder optical system and a second position in which an exposure can be carried out by image pickup means;
   a display device arranged to make a display by superimposing a light from a light source on an image obtained within a viewfinder;
   continuous exposure means for carrying out a continuous exposure operation; and
   a control circuit arranged to cause said light source to begin to light up during the movement of said movable mirror from the second position to the first position after exposure, when the continuous exposure operation by said continuous exposure means is in process.

11. A camera according to claim 10, wherein said continuous exposure means is arranged to carry out the continuous exposure operation when an accessory is mounted on a camera body.

12. A camera according to claim 10, wherein said control circuit is arranged to allow said light source to begin to light up after completion of the motion of said movable mirror from the second position to the first position, when said continuous exposure means is inoperative.

13. A camera according to claim 12, wherein said display device is arranged to make the display observable through said viewfinder by guiding a light emitted by said light source to said viewfinder optical system.

14. A camera according to claim 13, wherein said display device is arranged to cause the light emitted by said light source to be projected on a focusing screen within said viewfinder optical system.

15. A camera according to claim 12, further comprising a light receiving device arranged to receive at least a part of said image light flux.

16. A camera according to claim 15, wherein said light receiving device is arranged to begin performing a light receiving action after said control circuit stops said light source from lighting up.

17. A camera according to claim 16, wherein said light receiving device is arranged to perform a light measuring action.

18. A camera according to claim 16, wherein said light receiving device is arranged to perform a focus detecting action.

19. A camera according to claim 10, wherein said continuous exposure means is arranged to carry out the continuous exposure operation when a power supply voltage is higher than a predetermined value.

* * * * *

UNITED STATES PATENT AND TRADEMARK OFFICE
CERTIFICATE OF CORRECTION

PATENT NO. : 5,802,408
DATED : September 1, 1998
INVENTOR(S) : Yasuo Suda

It is certified that error appears in the above-identified patent and that said Letters Patent is hereby corrected as shown below:

Col. 16, line 12, Delete "BUSs" and insert --BUS5--.

Col. 16, line 15, Delete "BUSS" and insert --BUS5--.

Col. 18, line 44, "After" advantage" insert --;--.

Signed and Sealed this

Twenty-third Day of February, 1999

Attest:

Q. TODD DICKINSON

*Attesting Officer*          *Acting Commissioner of Patents and Trademarks*